United States Patent
Reinhold

(10) Patent No.: US 9,459,023 B1
(45) Date of Patent: Oct. 4, 2016

(54) SOLAR COLLECTOR SYSTEM FOR A HOT WATER TANK

(76) Inventor: Robert K. Reinhold, Chino Valley, AZ (US)

(*) Notice: Subject to any disclaimer, the term of this patent is extended or adjusted under 35 U.S.C. 154(b) by 1154 days.

(21) Appl. No.: 13/492,014

(22) Filed: Jun. 8, 2012

Related U.S. Application Data

(60) Provisional application No. 61/494,430, filed on Jun. 8, 2011.

(51) Int. Cl.
*F24J 1/00* (2006.01)
*F24J 2/34* (2006.01)
*F24J 2/04* (2006.01)

(52) U.S. Cl.
CPC .. *F24J 2/345* (2013.01); *F24J 2/04* (2013.01)

(58) Field of Classification Search
USPC ................. 126/640, 688, 641, 584
See application file for complete search history.

(56) References Cited

U.S. PATENT DOCUMENTS

| | | | |
|---|---|---|---|
| 3,939,819 A | | 2/1976 | Minardi |
| 4,019,495 A | * | 4/1977 | Frazier ................ F24J 2/402 126/588 |
| 4,047,518 A | | 9/1977 | Anderson |
| 4,170,984 A | | 10/1979 | Scheffe |
| 4,186,721 A | | 2/1980 | Whitman |
| 4,296,729 A | * | 10/1981 | Cooper ............... F24D 17/0021 126/584 |
| 4,335,706 A | | 6/1982 | Passarelli et al. |
| 4,421,097 A | * | 12/1983 | Meckler ............... F24D 11/003 126/585 |
| 4,474,170 A | | 10/1984 | McConnell et al. |
| 4,917,173 A | | 4/1990 | Brown et al. |
| 2010/0170092 A1 | * | 7/2010 | Mills ..................... F24J 2/465 29/890.033 |

* cited by examiner

*Primary Examiner* — Avinash Savani
(74) *Attorney, Agent, or Firm* — Robert C. Montgomery; Montgomery Patent & Design

(57) ABSTRACT

A solar energy collector utilizes a darkened fluid contained within an enclosure to affect heat transfer into water flowing through tubing submerged within the fluid. The water is heated and plumbed into a pair of holding tanks which are incorporated into an existing hot water system. The heating and circulation of the heated water is fully automated.

11 Claims, 4 Drawing Sheets

SOLAR COLLECTOR SYSTEM FOR A HOT WATER TANK

RELATED APPLICATIONS

The present invention was first described in and claims the benefit of U.S. Provisional Application No. 61/494,430, filed Jun. 8, 2011, the entire disclosures of which are incorporated herein by reference.

FIELD OF THE INVENTION

The present invention relates generally to solar energy gathering systems, and in particular, to a solar energy gathering system utilizing a fluid energy transfer medium.

BACKGROUND OF THE INVENTION

A household appliance which many people do not think about, but operates all day long, is the hot water heater. Whether electrically operated or gas-fired, these hot water heaters keep a large supply of water at a constant elevated temperature whether anyone is home or awake to use it or not. Many users resort to the use of solar water heaters to heat water using the free energy from the sun.

While such solar water heaters do work, they are not very efficient and often require the supplemental use of conventional water heaters as well. Accordingly, there exists a need by which the efficiency of solar water heaters can be raised in order to lower the overall energy use and save operating costs. The development of the solar collection system for a hot water tank fulfills this need.

Various attempts have been made to provide solar energy gathering system for water heating. Examples of these attempts can be seen by reference to several U.S. patents. U.S. Pat. No. 3,939,819, issued in the name of Minardi, describes a solar radiant energy collector. This patent discloses a solar energy collector having transparent tubing to allow for the heating of a dark colored liquid. This patent does not disclose an energy collector to affect heat transfer into water contained within tubing submerged within a darkened, solar energy transferring fluid and then plumbing the water into holding tanks incorporated into an existing water system.

U.S. Pat. No. 4,047,518, issued in the name of Anderson, describes a solar heating cell. This patent discloses a solar cell for the heating of a darkened liquid to deliver heat to a heat storage medium arranged in the interior of a structure. This patent does not disclose an energy collector to affect heat transfer into water contained within tubing submerged within a darkened, solar energy transferring fluid and then plumbing the water into holding tanks incorporated into an existing water system.

U.S. Pat. No. 4,335,706, issued in the name of Passarelli, describes an energy collector and transfer apparatus. This patent describes a solar energy collector that utilizes a darkened liquid to transfer solar energy to a gaseous substance which is then compressed into a liquid state, thus increasing its temperature. The now liquid substance can now be used to heat a third medium, such as water for a water system. This patent does not disclose an energy collector to affect heat transfer into water contained within tubing submerged within a darkened, solar energy transferring fluid and then plumbing the water into holding tanks incorporated into an existing water system.

While these systems fulfill their respective, particular objectives, each of these references suffer from one (1) or more disadvantages. Many such devices are not suited for heating water for a hot water system without the use of an intermediate gaseous medium that is later compressed to a liquid. Accordingly, there exists a need for a solar energy collector system without the disadvantages as described above. The development of the present invention substantially departs from the conventional solutions and in doing so fulfills this need.

SUMMARY OF THE INVENTION

The inventor has recognized the aforementioned inherent problems and lack in the art and observed that there is a need for solar energy collection system for the heating of water for use with an existing hot water system.

Accordingly, it is an object of the present embodiments of the invention to solve at least one (1) of these problems. The inventor has addressed this need by developing a solar collector system for a hot water tank utilizing a dark fluid to affect heat transfer into the water.

To achieve the above objectives, it is an object of the present invention to provide a system designed to utilize sunlight to heat a stream of water within a solar collector assembly before plumbing the heated water into holding tanks incorporated into an existing hot water system.

Another object of the present invention is where the solar collector assembly contains a dark fluid which absorbs solar energy and transfers that energy into an internal tubing assembly.

Yet still another object of the present invention is where water circulates through the tubing assembly and is heated by the dark fluid.

Yet still another object of the present invention is where the heating and circulation of the heated water is fully automated after installation of the system.

Yet still another object of the present invention is where the solar collector assembly is preferably installed upon a roof portion of a domicile.

Yet still another object of the present invention is where the remaining components of the system are preferably installed within a basement portion of a domicile.

Yet still another object of the present invention is where the system further comprises a plumbing assembly providing fluid communication between the major components of the system, a water pump that directs the water through the plumbing assembly, that receives water from a domestic water inlet pipe, and that fills a primary tank and a secondary tank with water.

Yet still another object of the present invention is where water flow control components regulate the flow of water through the system, divert water to the secondary tank when the water in the primary tank reaches a predetermined level, and activate the system when the temperature of the water drops below a minimum predetermined level.

Yet still another object of the present invention is where the water in the tanks is circulated through the solar collector assembly to heat.

Yet still another object of the present invention is where the tanks automatically maintain the heated water at a constant temperature.

Yet still another object of the present invention is where the solar collector assembly comprises the tubing assembly, glass panes, a perimeter gasket, a collector frame, a solar panel frame, and an insulated enclosure.

Yet still another object of the present invention is where the planes of glass are separated by approximately one-half an inch (½ in.) with the tubing assembly secured between the panes.

Yet still another object of the present invention is where the glass panes and tubing assembly are sealed and supported by the perimeter gasket and secured by the collector frame.

Yet still another object of the present invention is where a dark fluid is also contained within the panes and gasket and surrounds the tubing assembly, preferably comprises used motor oil or another dark and thermally-conductive liquid and is accessed with a fill tube.

Yet still another object of the present invention is where the panes, gasket, tubing assembly, and dark fluid are contained within the insulated enclosure.

Yet still another object of the present invention is where the tubing assembly extends through the gasket and enclosure and attaches to the plumbing assembly.

Yet still another object of the present invention is where the solar panel frame comprises a photovoltaic cell along a perimeter edge and, along with a rechargeable battery provide power the water pump and associated water flow control components of the system.

Yet still another object of the present invention is where the solar collector assembly is attached to the roof of the domicile using a mounting bracket assembly that allows for the adjustment of the solar collector assembly for the optimum azimuth angle.

Yet still another object of the present invention is to provide a method of utilizing the system that may be achieved by performing the following steps: procuring a model of the system having a particularly sized solar collector assembly or a particular number of solar collector assemblies based upon a corresponding BTU requirement needed to supply a sufficient volume of heated water to the domicile; pre-positioning the solar collector assembly and mounting bracket assembly onto the roof surface being careful to point the solar collector assembly in a direction which will maximize solar energy absorption; mounting the mounting bracket assembly to the roof portion of the domicile; adjusting the mounting bracket assembly to a correct azimuth angle to further optimize solar absorption; incorporating the water pump, primary tank, and secondary tank portions into an existing domestic hot water tank/system within the domicile; routing necessary piping and wiring from the solar collector assembly and photovoltaic cell portions to the reconfigured hot water system using conventional plumbing methods; and, allowing a period of time for the photovoltaic cell to charge the battery; allowing additional time for the automatic heating and circulation functions of the system to supply heated water to the tanks.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
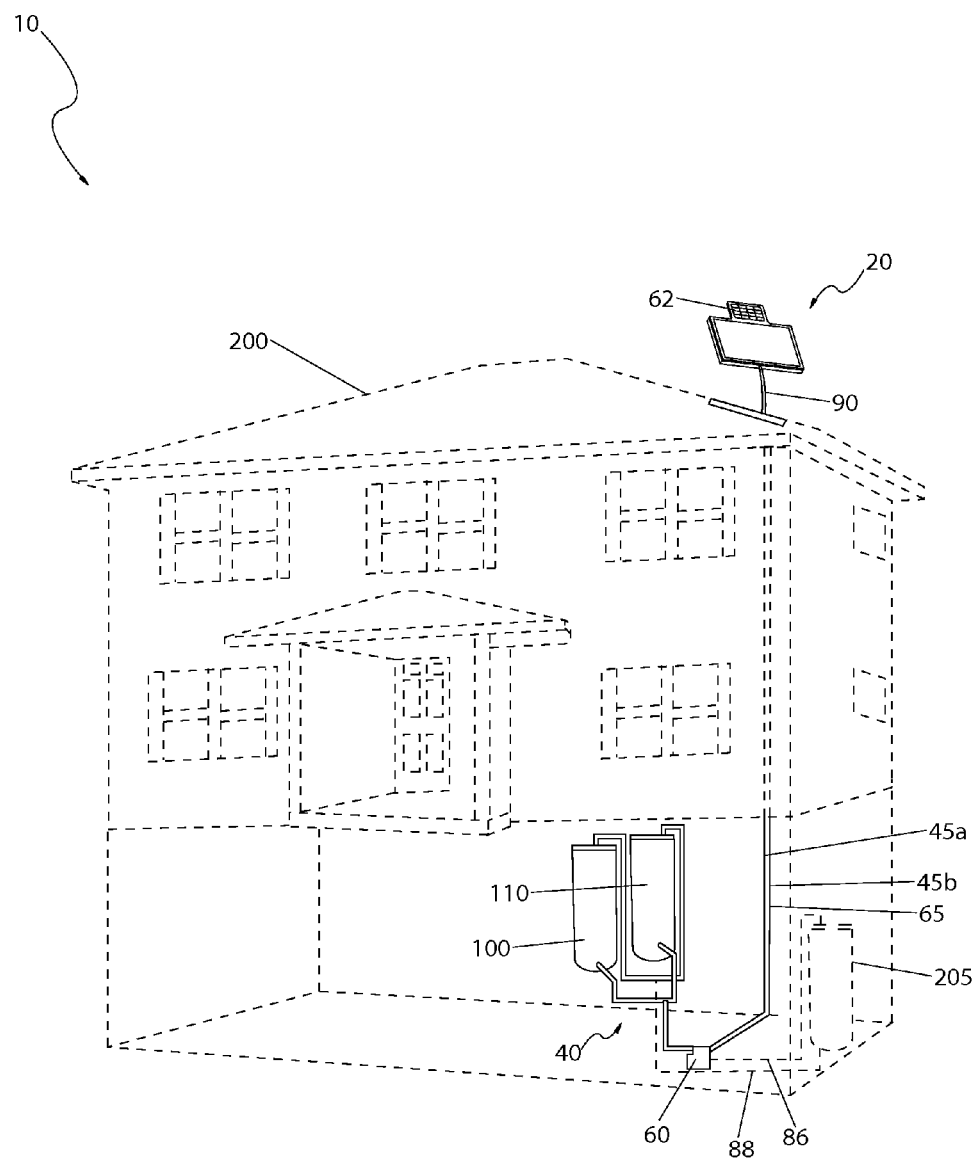
FIG. 1 is an environmental view of a solar collector system for a hot water tank 10, according to a preferred embodiment.

DESCRIPTIVE KEY 10 solar collector system for a hot water tank
20 solar collector assembly
22a top glass pane
22b bottom glass pane
23 tubing assembly
25 gasket
26 fluid
27 collector frame
28 solar panel frame
30 enclosure
31 insulation layer
32 fill tube
33 pipe cap
34 reflective surface
40 plumbing assembly
41 collector inlet tube
43 collector outlet tube
45a collector inlet tube
45b collector outlet tube
47 pressure relief pipe
60 water pump
62 photovoltaic cell
64 battery
65 wiring
67 diode
70 outlet water valve
72 inlet water valve
80 supply water
84 heated water
86 domestic inlet pipe
88 domestic outlet pipe
90 mounting bracket assembly
92 main bracket
94 collector bracket
96 roof bracket
98 fastener
100 primary tank
101 primary tank outlet
102 primary tank inlet
104 first temperature switch
106 second temperature switch
107 third temperature switch
108 forth temperature switch
109 fifth temperature switch
110 secondary tank
111 secondary tank outlet
112 secondary tank inlet
114 heating element
200 domicile
202 roof surface
205 existing hot water tank/system

DETAILED DESCRIPTION OF THE PREFERRED EMBODIMENT

The best mode for carrying out the invention is presented in terms of its preferred embodiment, herein depicted within the FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The system 10 is designed to utilize full spectrum radiation of sunlight to heat a stream of water 80 within a solar collector assembly 20. The sunlight passes through and is absorbed by a volume of a dark fluid 26 which fills the collector assembly 20 and surrounds an internal tubing assembly 23. A flow of water 84 circulates through the tubing assembly 23 and is heated. The heated water 84 is then plumbed into a pair of tanks 100, 110 which are in addition to an existing hot water tank/system 205, allowing the heated water 84 to be used in a normal manner. The heating and circulation of the heated water 84 is fully automated after installation.

Referring now to FIG. 1, an environmental view of the system 10, according to a preferred embodiment, is disclosed. The solar collector assembly portion 20 of the system 10 is illustrated here being installed upon a roof portion of a domicile 200. The remaining components of the system 10 are illustrated being installed within the residential domicile 200; however, it is understood that commercial buildings and other structures may also utilize the teachings of the system 10 with equal benefit. Furthermore, the major components of the system 10 are to be interconnected using conventional plumbing methods and therefore may be arranged in various manners, and as such should not be interpreted as a limiting factor of the system 10.

The system 10 comprises a plumbing assembly 40 which provides fluid communication between the major components of the system 10. The plumbing assembly 40 comprises various lengths of pipe and tubing including a collector inlet tube 45a, a collector outlet tube 45b, a primary tank outlet pipe 101, a primary tank inlet pipe 102, a secondary tank outlet pipe 111, a secondary tank inlet pipe 112, a water pump 60, an outlet water valve 70, an inlet water valve 72, a domestic inlet pipe 86, and a domestic outlet pipe 88, a pair of pressure relief pipes 47, and associated plumbing fittings. The plumbing assembly 40 receives supply water 80 from the domestic water inlet pipe 86 which in turn fills primary tank 100 and secondary tank 110 portions of the system 10. The water within the tanks 100, 110 is automatically circulated through a roof-mounted solar collector assembly 20 to heat and automatically maintain the heated water 84. The heated water 84 is then plumbed into the existing hot water heater/system 205 for utilization by users in a normal manner throughout the domicile 200 (see also FIG. 4).

Figure 4:
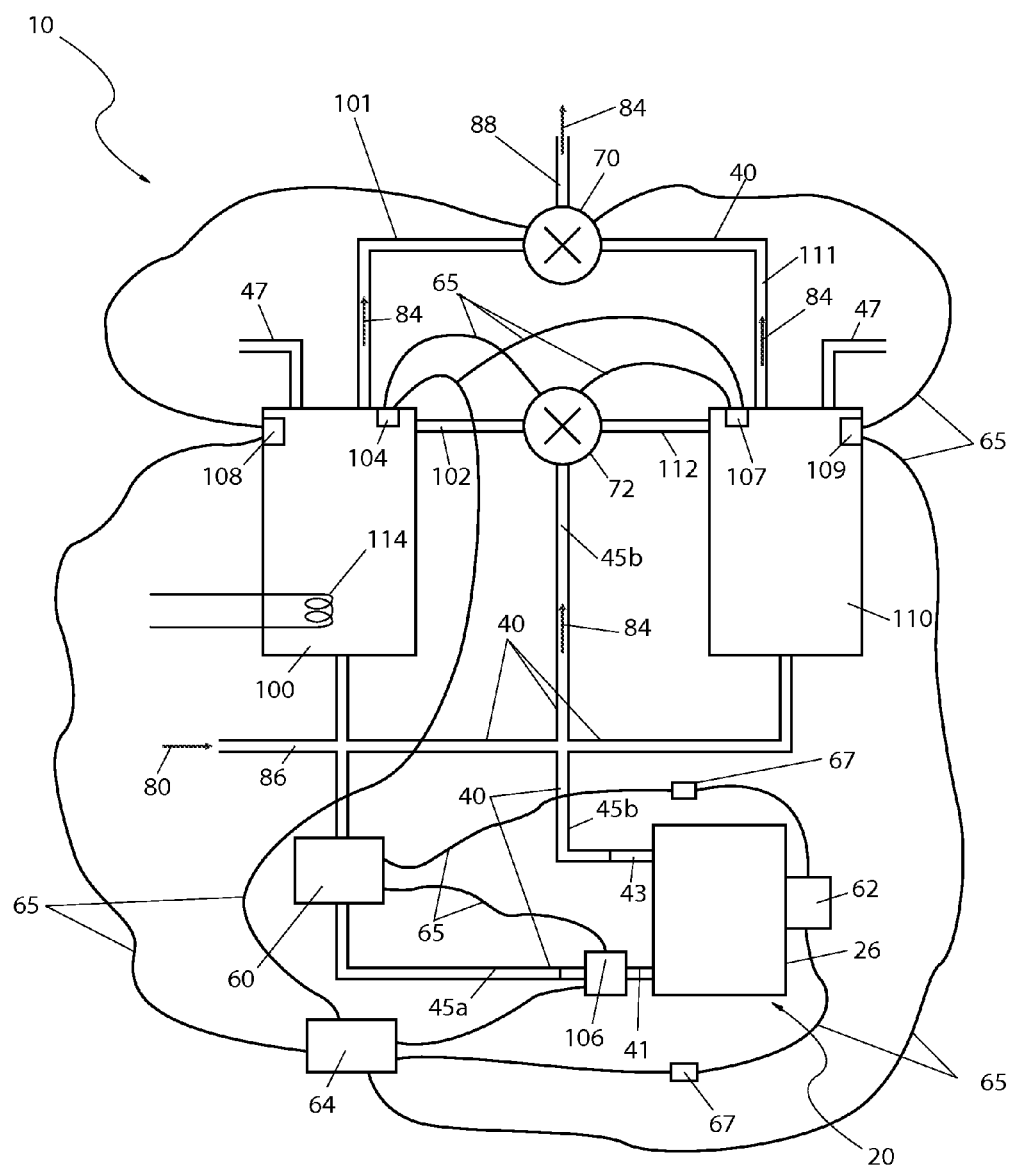

The system 10 is depicted here working in conjunction with an existing hot water tank; however, the system 10 comprises an internal heating element 114, thereby enabling the system 10 to be configured without an auxiliary hot water tank if so desired (see FIG. 4).

Figure 2:
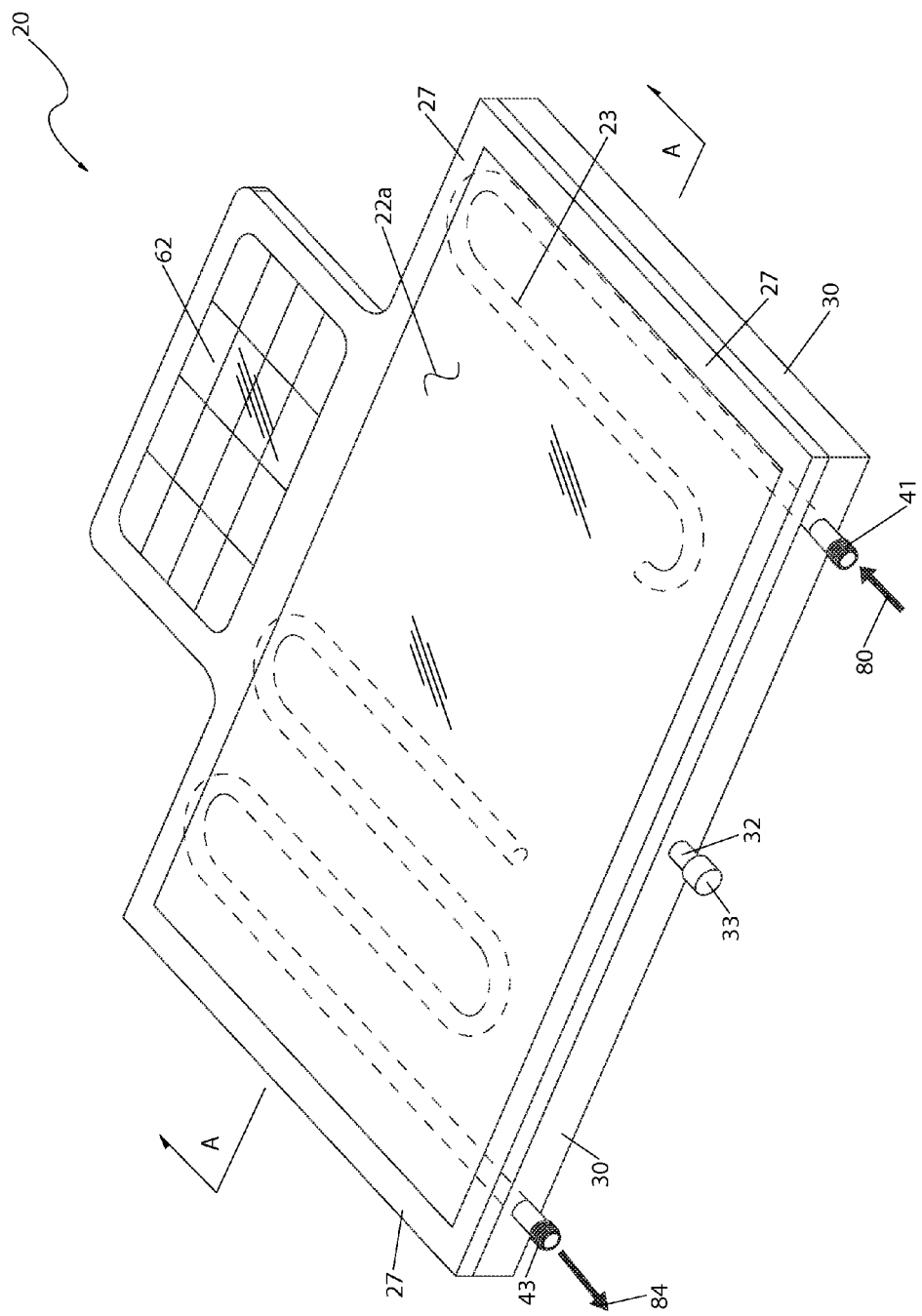
FIG. 2 is a perspective view of a solar collector assembly portion 20 of the solar collector system for a hot water tank 10, according to a preferred embodiment.
Figure 3:
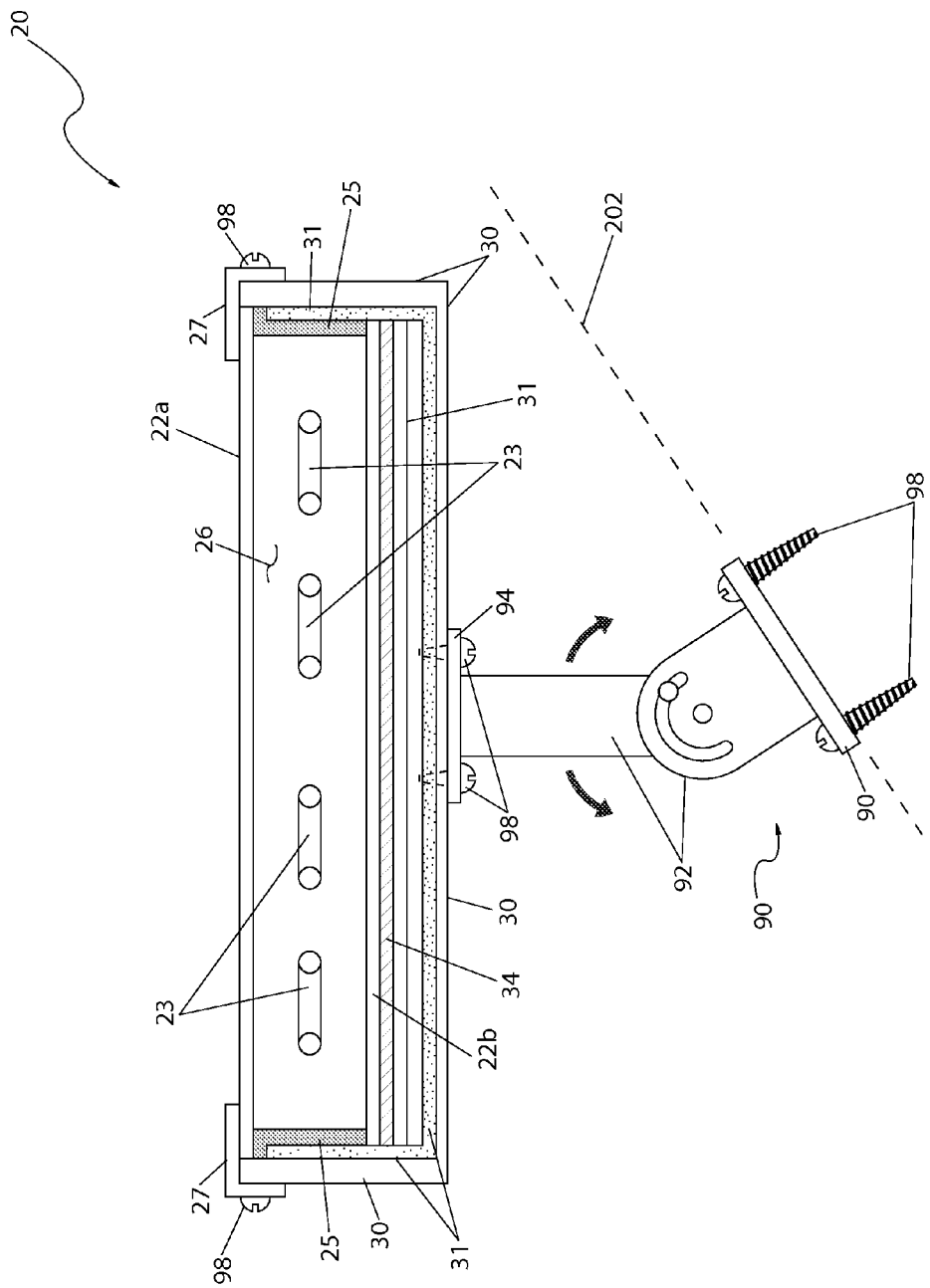
FIG. 3 is a section view of the solar collector assembly portion 20 taken along section line A-A (see FIG. 2), according to a preferred embodiment; and, FIG. 4 is a fluid block diagram of the solar collector system for a hot water tank 10, according to the preferred embodiment.

Referring now to FIGS. 2 and 3, perspective and section views of the solar collector assembly portion 20 of the system 10, are disclosed. The solar collector assembly 20 comprises a top glass pane 22a, a parallel bottom glass pane 22b, a tubing assembly 23, a perimeter gasket 25, a volume of fluid 26, a collector frame 27, a solar panel frame 28, and a structural enclosure 30. The top 22a and bottom 22b glass panes are separated by approximately one (1) inch so as to entrap a copper tubing assembly 23 therebetween. Said glass panes 22a, 22b have similar shapes and are sealed therebetween all around at an edge portion of the bottom glass pane 22b via an adhesively-bonded extruded gasket 25 preferably made using closed-cell neoprene or equivalent flexible sealing material. The top glass pane 22a is preferably made using a tempered borosilicate glass for impact protection and improved light transmission where the bottom glass pane 22b may be made using a lesser expensive type glass. The tubing assembly 23 comprises a serpentine length of tubing between inner vertical surfaces of the gasket 25. The gasket 25 is envisioned to be flexible enough to accommodate expansion of the fluid 26 during heating, thereby protecting the system 10 from being stressed.

The glass panes 22a, 22b and the gasket 25 define an internal three-dimensional rectangular volume which is then filled with a dark light-absorbing fluid 26. The fluid 26 preferably comprises used motor oil or other dark and thermally-conductive liquid. The transparent construction of the top glass pane 22a enables sunlight to pass into and heat the dark fluid 26. The tubing assembly 23 comprises a length of tubing approximately one-half an inch (½ in.) in diameter and arranged in a serpentine manner to maximize surface area and an amount of heat energy transferred from the fluid 26 into the flow of water 84 within the tubing assembly 23. The tubing assembly 23 is preferably made using copper due to the high thermal conductivity. The tubing assembly 23 provides end portions comprising a collector inlet tube 41 and a collector outlet tube 43. Said tubes 41, 43 penetrate through and are sealed by the gasket 25. Each tube 41, 43 also comprises a soldered threaded pipe adapter fitting for attachment to tube portions 45a, 45b of the plumbing assembly 40 (see FIGS. 1 and 4).

Said glass panes 22a, 22b, gasket 25, and fluid 26 are secured within a box-like enclosure 30 made of a structural material such as fiberglass, aluminum, wood, or the like. The enclosure 30 comprises a five-sided structure being approximately four (4) feet square and three (3) inches in height further comprising a polystyrene insulation layer 31 or equivalent material on all side and bottom interior surfaces to improve the thermal efficiency of the solar collector assembly 20. The enclosure 30 further comprises a reflective surface 34 preferably made using reflective aluminum foil or an equivalent material being positioned below the bottom glass pane 22b to reflect any remaining heat energy upwardly through the fluid 26. A collector frame 27 comprising a metal angle shape extends along a top of the enclosure 30 over the top glass pane 22a and is affixed using a plurality of equally-spaced fasteners 98.

The enclosure 30 further comprises an integral solar panel frame 28 which entraps and holds a photovoltaic cell 62 along a perimeter edge. Said solar panel frame 28 and photovoltaic cell 62 are positioned in a coplanar manner in relation to the top glass pane 22a. The solar panel frame 28 extends outwardly from a top edge of the enclosure 30. The photovoltaic cell 62 provides DC power to the pump 60 and battery 64 portions of the system 10. It is envisioned that a pair of in-line diodes 67 are utilized to condition the DC power for use by the respective pump 60 and battery 64 portions (see FIGS. 1 and 4).

It is understood that actual length and width dimensions of the solar collector assembly 20 may vary based upon system 10 heat generation requirements. Furthermore, a plurality of solar collector assemblies 20 may be utilized within the system 10 based upon the capacity of the primary tank 100 and the secondary tank 110 portions of the system 10 and anticipated heated water 84 usage by a user, and as such should not be interpreted as a limiting factor of the system 10.

The fluid 26 is installed into the inner space of the solar collector assembly 20 initially via a fill tube 32 which penetrates and is sealed by the gasket 25 in a similar manner as the aforementioned collector tubes 41, 43. The fill tube 32 protrudes outwardly and is positioned between the collector inlet 41 and collector outlet 43 tubes. The fill tube 32 further comprises a pipe cap 33 to fill and seal the fluid 26.

The solar collector assembly 20 is preferably mounted to a roof surface or other appropriate external feature on or near the domicile 200 using a mounting bracket assembly 90 or other equivalent means. The mounting bracket assembly 90 preferably provides single-axis adjustability and a securing means to allow the top glass pane portion 22a of the solar collector assembly 20 to face the sun at an optimum angle for a particular location. The mounting bracket assembly 90 comprises an angularly-adjustable two-part main bracket 92, further comprising integral collector bracket 94 and roof bracket 96 portions at top and bottom ends of said main bracket 92. The collector bracket 94 and roof bracket 96 comprise perpendicular plate portions having a plurality of apertures to facilitate strong anchoring of the mounting bracket assembly 90 to a bottom surface of the solar collector assembly 20 and to a roof surface portion 202 of the domicile 200, respectively, using threaded fasteners 98 such as lag screws, bolts, or the like. The mounting bracket assembly 90 is preferably a waterproof and resilient metallic construction.

Referring now to FIG. 4, a fluid block diagram of the system 10, according to the preferred embodiment, is disclosed. The water pump 60 directs the water 84 through the plumbing assembly 40 and subsequently through the solar collector assembly 20. The heated water 84 is then conveyed through the plumbing assembly 40 into either the primary tank 100 or the secondary tank 110. Said flow of heated water 84 may be selectively circulated through the primary tank 100 or the secondary tank 110 via a water-directing outlet water valve 70 and an inlet water valve 72 which comprise standard electric solenoid units.

The valves 70, 72 open and close based upon states of corresponding temperature switches within the tanks 100, 110. The outlet water valve 70 is in electrical communication with and operably controlled by a forth temperature switch 108 and a fifth temperature switch 109 located within the primary 100 and secondary 110 tanks, respectively. In like manner, the inlet water valve 72 is in electrical communication with and operably controlled by a first temperature switch 104 and a third temperature switch 107 located within the primary 100 and secondary 110 tanks, respectively. Said temperature switches 104, 107, 108, 109 are envisioned to be configured to sense water temperatures within the respective tanks 100, 110 so as to directionally control a flow of heated water 84 from a desired tank 100, 110, through the solar collector assembly 20, and in like manner directionally control a flow of heated water 84 through a domestic outlet pipe 88 and into the existing hot water tank/system 205 from the selected tank 100, 110.

The system 10 comprises a photovoltaic cell 62 which provides electrical power to the pump 60 and a recharging voltage to a DC battery 64. The battery 64 in turn powers the valves 70, 72 and the temperature switches 104, 106, 107, 108, 109. The pump 60 receives power directly from the photovoltaic cell 62 and therefore functions continuously as long as power is generated by said photovoltaic cell 62 in an automatic manner. The pump 60 receives electrical power from the photovoltaic cell 62 or the second temperature switch 106.

The system 10 comprises a second temperature switch 106 being mounted to the collector inlet tube 41 located adjacent to the enclosure 30 which provides a means to prevent freezing of water 84 within outdoor portions of the system 10. Said second temperature switch 106 senses a temperature of the water 84 within the collector inlet tube 41 and the adjacent solar collector assembly 20, and activates the pump 60 when the water within the collector inlet tube 41 drops below a pre-determined minimum temperature. In a low temperature condition, the second temperature switch 106 directs power from the battery 64 to the pump 60 to circulate water 84 to prevent freezing throughout the system 10. The battery 64 provides power to operate the pump 60 and prevent freezing even during times of insufficient sunlight. The second temperature switch 106 automatically deactivates once the temperature of the water 84 within the collector inlet tube 41 and solar collector assembly 20 reaches a sufficiently high "above-freezing" temperature.

A flow of supply water 80 is provided to the system 10 via a domestic inlet pipe 86 to pressurize the system 10 and provide make-up water which is in turn plumbed to the tanks 100, 110 and to the pump 60. Subsequently, the pump 60 circulates supply water 80 to the collector inlet tube portion 41 of the solar collector assembly 20. The collector outlet tube portion 43 of the solar collector assembly 20 is in fluid communication with the inlet water valve 72. The inlet water valve 72 is further in fluid communication with, and selectively directs the heated water 84 through primary tank inlet 102 and secondary tank inlet 112 portions and into the respective tanks 100, 110.

Heated water 84 is supplied to the existing hot water tank/system 205 on a continuous basis as the water 84 is selectively released via plumbing assembly portions 40, being plumbed through the outlet water valve 70 which is in fluid communication with primary tank outlet 101 and secondary tank outlet 111 portions of the respective tanks 100. The state of the outlet water valve 70, based upon the previously described forth 108 and fifth 109 temperature switches, selectively directs the water 84 from the primary 100 or secondary 110 tank, out a domestic outlet pipe portion 88 of the outlet water valve 70, and into the existing hot water tank/system 205. The outlet 70 and inlet 72 valves comprise switching solenoid valves which are controlled by the temperature switches 104, 107, 108, 109. Furthermore, the tanks 100, 110 are envisioned to comprise respective pressure relief pipes 47 to protect the system 10 from possible over-pressurization.

The system 10 provides a means to be configured in a stand-alone manner or configured to utilize an existing hot water heater within the domicile 200 via a heating element 114 within the primary tank 100. The internal heating element 114 may be wired to existing controlled electrical power to provide optional heating capability, thereby enabling the system 10 to alternately produce heated water 84 using the heating element 114, if so configured.

In a preferred configuration of the system 10, the outlet water valve 70, the inlet water valve 72, and associated temperature switches 104, 107, 108, 109 allow heated water 84 to flow in and out of the primary tank 100 while preventing heated water 84 from flowing into the secondary tank 110. The water pump 60 then receives the water 84 from the primary tank outlet 101 and pumps it into the collector inlet tube portion 41 of the solar collector assembly 20. The water 84 is then heated within the tubing assembly 23 and exits from the collector outlet tube 43. The heated water 84 flows through the inlet water valve 72 and back into the primary tank 100 at an increased temperature. The secondary tank 110 stores an additional volume of heated water 84 to further increase the available supply of ready heated water 84 to the water tank/system 205. When needed, the outlet water valve 70 and/or the inlet water valve 72 are switched to allow water 84 to flow to and from the secondary tank 11 while preventing heated water 84 from flowing into the primary tank 100.

All electrical portions of the system 10 are interconnected using common copper wiring 65.

The system 10 is intended to provide various benefits to a user over existing methods of providing heated water 84 for residential water systems 205. The system 10 is illustrated here being connected to an existing water tank/system 205 to supplement a conventional water heating system. The system 10 utilizes a self-contained solar energy means to provide the necessary electrical and heat energy for the operation of the system 10. The system 10 utilizes a stationary dark fluid 26 which absorbs sunlight with high efficiency, limits heat loss due to re-radiation from the tubing assembly 23, and utilizes heat conduction to heat the tubing assembly 23 from all sides and thereby increases the rate and efficiency of heat transferred to the water 84 flowing through the system 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1, 3, and 4.

The method of installing and utilizing the system 10 may be achieved by performing the following steps: procuring a model of the system 10 having a particularly sized solar collector assembly 20 or a particular number of solar collector assemblies 20 based upon a corresponding BTU requirement needed to supply a sufficient volume of heated water 84 to the domicile 200; pre-mounting the collector bracket portion 94 of the mounting bracket assembly 90, or equivalent mounting means, to the solar collector assembly 20, unless previously attached, using the provided fasteners 98; pre-positioning the solar collector assembly 20 and mounting bracket assembly 90 onto a roof or other appropriate surface 202 being careful to point the solar collector assembly 20 in a direction which will maximize solar energy absorption; mounting the roof bracket portion 96 of the mounting bracket assembly 90 to the domicile 200 using the provided fasteners 98; adjusting and tightening the two-piece main bracket portion 92 of the mounting bracket assembly 90 to a desired angle to further optimize solar absorption; routing and assembling necessary piping 45 and wiring 65 portions of the system 10 as needed; incorporating the water pump 60, primary tank 100, and secondary tank 110 portions into an existing domestic hot water tank/system 205 within the domicile 200 using conventional plumbing methods; allowing a period of time for the photovoltaic cell 62 to charge the battery 64; allowing additional time for the automatic heating and circulation functions of the system 10 to heat and circulate the heated water 84 to the tanks 100, 110; and, benefiting from the utilization of a natural solar energy source to heat a volume of water 84 for use within a user's domicile 200 using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A solar collector for a hot water tank comprising:
    a plumbing assembly including:
        a primary tank and a secondary tank in fluid communication therewith;
        inlet and outlet water valves each in fluid communication with said primary and secondary tanks, respectively; and,
        a pump in fluid communication with said primary and secondary tanks as well as said inlet water valve; and,
    a solar collector assembly in fluid communication with said plumbing assembly, said solar collector assembly containing a volume of dark liquid heated by sunlight directed towards said solar collector assembly, further comprising:
        a transparent top glass pane and a bottom glass pane spaced therefrom, said bottom glass pane being registered parallel to said top glass pane;
        a tubing assembly formed from heat conductive material and entrapped between said top and bottom glass panes;
        a gasket sealed around a perimeter of said top and bottom glass panes;
        a reflective surface positioned below said bottom glass pane for reflecting heat energy upwardly towards said dark liquid;
        a photovoltaic cell in electrical communication with said pump; and,
        a fill tube spaced from said tubing assembly for channeling said dark liquid into an interior of said solar collector assembly;
    wherein said dark liquid is housed between said top and bottom glass panes and engaged with an outer surface of said tubing assembly; and,
    wherein said pump directs water from said primary and secondary tanks to said tubing assembly, said dark liquid heating said water such that a temperature of said water exiting said tubing assembly is higher than a temperature of said water entering said tubing assembly, said dark liquid remaining disposed within said solar collector assembly as said heated water exits therefrom.

2. The solar collector of claim 1, wherein said dark liquid conducts heat within said solar collector assembly and thereby heats said water circulating through said solar collector assembly.

3. The solar collector of claim 1, further comprising a rechargeable battery communicatively coupled to said photovoltaic cell, said rechargeable battery supplying power to said pump when a temperature of said water entering said solar collector assembly falls below a minimum temperature.

4. The solar collector of claim 1, further comprising a plurality of switches each electrically coupled to said inlet and outlet water valves;
wherein selected ones of said switches sense a corresponding water temperature at said primary and secondary tanks, respectively, and thereby directionally control a flow of heated water through said plumbing assembly and said solar collector assembly.

5. The solar collector of claim 4, wherein one of said switches senses a temperature of water entering said solar collector assembly, said one switch causing automatic toggling of said pump between active and inactive modes when the water temperature entering said solar collector assembly drops below and rises above a minimum temperature, respectively.

6. A solar collector for a hot water tank comprising:
a plumbing assembly including:
a primary tank and a secondary tank in fluid communication therewith;
inlet and outlet water valves each in fluid communication with said primary and secondary tanks, respectively; and,
a pump in fluid communication with said primary and secondary tanks as well as said inlet water valve; and,
a solar collector assembly adapted to be positioned on an existing roof surface in fluid communication with said plumbing assembly, said solar collector assembly containing a volume of dark liquid heated by sunlight directed towards said solar collector assembly, further comprising:
a transparent top glass pane and a bottom glass pane spaced therefrom, said bottom glass pane being registered parallel to said top glass pane;
a tubing assembly formed from heat conductive material and entrapped between said top and bottom glass panes;
a gasket sealed around a perimeter of said top and bottom glass panes;
a reflective surface positioned below said bottom glass pane for reflecting heat energy upwardly towards said dark liquid;
a photovoltaic cell in electrical communication with said pump; and,
a fill tube spaced from said tubing assembly for channeling said dark liquid into an interior of said solar collector assembly;
wherein said dark liquid is housed between said top and bottom glass panes and engaged with an outer surface of said tubing assembly;
wherein said pump directs water from said primary and secondary tanks to said tubing assembly, said dark liquid heating said water such that a temperature of said water exiting said tubing assembly is higher than a temperature of said water entering said tubing assembly, said dark liquid remaining disposed within said solar collector assembly as said heated water exits therefrom; and,
wherein said inlet water valve selectively channels said heated water from said tubing assembly to said primary and secondary tanks, wherein said outlet water valve selectively channels heated water out from said primary and secondary tanks.

7. The solar collector of claim 6, wherein said dark liquid conducts heat within said solar collector assembly and thereby heats said water circulating through said solar collector assembly.

8. The solar collector of claim 6, further comprising a rechargeable battery communicatively coupled to said photovoltaic cell, said rechargeable battery supplying power to said pump when a temperature of said water entering said solar collector assembly falls below a minimum temperature.

9. The solar collector of claim 6, further comprising a plurality of switches each electrically coupled to said inlet and outlet water valves;
wherein selected ones of said switches sense a corresponding water temperature at said primary and secondary tanks, respectively, and thereby directionally control a flow of heated water through said plumbing assembly and said solar collector assembly.

10. The solar collector of claim 9, wherein one of said switches senses a temperature of water entering said solar collector assembly, said one switch causing automatic toggling of said pump between active and inactive modes when the water temperature entering said solar collector assembly drops below and rises above a minimum temperature, respectively.

11. A method of utilizing a solar collector for a hot water tank, said method comprising the steps of:
providing a plumbing assembly including:
a primary tank and a secondary tank in fluid communication therewith;
inlet and outlet water valves each in fluid communication with said primary and secondary tanks, respectively; and,
a pump in fluid communication with said primary and secondary tanks as well as said inlet water valve;
providing and positioning a solar collector assembly on an existing roof surface, further comprising:
a transparent top glass pane and a bottom glass pane spaced therefrom, said bottom glass pane being registered parallel to said top glass pane;
a tubing assembly formed from heat conductive material and entrapped between said top and bottom glass panes;
a gasket sealed around a perimeter of said top and bottom glass panes;
a reflective surface positioned below said bottom glass pane for reflecting heat energy upwardly;
a photovoltaic cell in electrical communication with said pump;
a fill tube spaced from said tubing assembly for channeling said dark liquid into an interior of said solar collector assembly; and,
a fill tube spaced from said tubing assembly;
fluidly communicating said solar collector assembly with said plumbing assembly;
providing and introducing a dark liquid into said solar collector assembly between said top and bottom glass panes engaged with an outer surface of said tubing assembly;
said dark liquid being heated by sunlight directed towards said solar collector assembly;
said pump directing water from said primary and secondary tanks to said solar collector assembly;

said dark liquid heating said water such that a temperature of said water exiting said solar collector assembly is higher than a temperature of said water entering said solar collector assembly, said dark liquid remaining disposed within said solar collector assembly as said heated water exists therefrom;

said inlet water valve selectively channeling said heated water from said solar collector assembly to said primary and secondary tanks; and, said outlet water valve selectively channeling heated water out from said primary and secondary tanks.

\* \* \* \* \*